United States Patent [19]
Ramakrishnan et al.

[11] Patent Number: 5,596,719
[45] Date of Patent: Jan. 21, 1997

[54] METHOD AND APPARATUS FOR ROUTING AND LINK METRIC ASSIGNMENT IN SHORTEST PATH NETWORKS

[75] Inventors: Kajamalai G. Ramakrishnan, Berkeley Heights; Manoel A. Rodrigues, Atlantic Highlands, both of N.J.

[73] Assignee: Lucent Technologies Inc., Murray Hill, N.J.

[21] Appl. No.: 521,285

[22] Filed: Aug. 29, 1995

Related U.S. Application Data

[63] Continuation of Ser. No. 83,822, Jun. 28, 1993, abandoned.

[51] Int. Cl.$^6$ ............................ G06F 13/00; H04L 12/56
[52] U.S. Cl. ...................... 395/200.02; 395/200.15; 370/238; 364/DIG. 1
[58] Field of Search ................ 370/60, 60.1, 94.1, 370/94.3, 54, 16; 364/402; 395/200.01, 200.02, 200.1, 200.15

[56] References Cited

U.S. PATENT DOCUMENTS

| | | | |
|---|---|---|---|
| 4,905,233 | 2/1990 | Cain et al. | 370/94.1 |
| 4,912,656 | 3/1990 | Cain et al. | 364/514 |
| 4,974,224 | 11/1990 | Boone | 370/94.1 |
| 5,115,495 | 5/1992 | Tsuchiya | 395/200.15 |
| 5,233,604 | 8/1993 | Ahmadi et al. | 370/60 |
| 5,253,161 | 10/1993 | Nemirovsky et al. | 364/402 |
| 5,272,638 | 12/1993 | Martin et al. | 364/444 |
| 5,289,462 | 2/1994 | Ahmadi et al. | 370/60.1 |
| 5,347,511 | 9/1994 | Gun | 370/54 |
| 5,404,451 | 4/1995 | Nemirovsky et al. | 395/200.01 |

OTHER PUBLICATIONS

J. M. McQuillan et al., "A Review of the Development and Performance of the ARPANET Routing Algorithm," *IEEE Transactions on Communications*, vol. COM–26, No. 12, 1802–1811 (Dec. 1978).

J. M. McQuillan et al., "The New Routing Algorithm for the ARPANET," *IEEE Transactions on Communications*, vol. COM–28, No. 5, 711–719 (May 1980).

A. Khanna et al., "The Revised ARPANET Routing Metric," *Computer Comm. Review*, SIGCOMM, 45–56 (1989) (No Month).

D. G. Cantor et al., "Optimal Routing in a Packet–Switched Computer Network," *IEEE Transactions on Computers*, vol. C–23, No. 10, 1062–1069 (Oct. 1974).

R. G. Gallager, "A Minimum Delay Routing Algorithm Using Distributed Computation," *IEEE Transactions on Communications*, vol. COM–25, No. 1, 73–85 (Jan. 1977).

T. E. Stern, "A Class of Decentralized Routing Algorithms Using Relaxation," *IEEE Transactions on Communications*, vol. COM–25, No. 19, 1092–1102 (Oct. 1977).

H. Frank et al., "Routing in Computer Networks," John Wiley & Sons, Inc., 99–112 (1971). (No Month).

H. Soroush et al., "The Stochastic Multicommodity Flow Problem," *Networks*, vol. 20, 121–155 (1990).

*Primary Examiner*—Parshotam S. Lall
*Assistant Examiner*—Viet Vu
*Attorney, Agent, or Firm*—Katharyn E. Olson

[57] ABSTRACT

The invention discloses a method and apparatus for assigning link "distance" metrics that result in near optimal routing for a network formed of nodes (routers) and links, where each link has a capacity associated with it, and where source-destination flows are given. The routing optimality is measured with respect to some objective function (e.g., average network delay).

9 Claims, 2 Drawing Sheets

METHOD AND APPARATUS FOR ROUTING AND LINK METRIC ASSIGNMENT IN SHORTEST PATH NETWORKS

This application is a continuation of application Ser. No. 08/083822, filed on Jun. 28, 1993, now abandoned.

TECHNICAL FIELD

The invention relates to a method and apparatus for improved routing in data networks. In particular, the invention discloses a method and apparatus for routing in shortest path networks that utilize a centralized assignment of link metrics.

BACKGROUND OF THE INVENTION

I. Introduction

Computer or dam networks, i.e. interconnected collections of autonomous computers, provide a variety of services such as electronic mail and data transfer services. FIG. 1 illustrates the structure of a typical computer network. The first part of the network typically comprises a collection of Machines 102, called hosts, intended for running application programs. The network also includes Communication Subnet 104 linking the hosts. The subnet's job is to carry messages from host to host. The subnet typically comprises two basic components: Routers (also called Switching Elements, Nodes or Interface Message Processors) 106 and Links (also called Transmission Lines) 108. Each host is connected to one, or occasionally several routers. See generally, Andrew S. Tanenbaum, Computer Networks, Prentice Hall, Inc., Englewood Cliffs, N.J., 1981.

The role of routing is to set up paths between nodes of the network for the efficient utilization of network services and for the efficient transfer of data. There are several classes of routing problems, e.g., routing in virtual-circuit networks, routing in datagram networks and routing in shortest-path networks.

II. Classes of Routing Problems in Data Networks

A. The General Routing Problem

There is extensive literature on the problem of optimal routing with respect to a given objective function such as average delay, subject to known link speeds or capacities and origin-destination (OD) offered traffic. Most efforts in this area have been focused on the general routing problem. D. G. Cantor and M. Gerla, "Optimal Routing in Packet Switched Computer Network," *IEEE Transactions Computers*, Vol. C-23, pp. 1062–1069, Oct. 1974; Robert G. Gallager, "A Minimum Delay Routing Algorithm Using Distributed Computation," *IEEE Transactions on Communications*, Vol. COM-25, No. 1, pp. 73–85, January 1977; Thomas E. Stern, "A Class of Decentralized Routing Algorithms Using Relaxation," *IEEE Transactions on Communications*, Vol. COM-25, No. 10, pp. 1092–1102, October 1977. A basic assumption in the general routing problem is that the flow from an origin-destination (OD) pair (i.e. between specific nodes in a network) can be randomized among several distinct paths, which makes the problem mathematically tractable since the flows at links become continuous variables. Although the general routing problem represents a large class of flow problems, routing in data networks is more restricted in most instances. Nonetheless, the solution to this problem is still useful for a large class of data networks since it constitutes a bound, i.e., no routing strategy can perform better than the solution to the general routing problem. The general routing problem constitutes finding the best solution for flows in a network such that the OD flow requirements and capacity constraints are satisfied and average network delay is minimized. This problem can be formulated as a non-linear multicommodity flow problem. H. Frank and W. Chou, "Routing in Computer Networks," *Networks*, vol. 1, pp. 99–122, 1971.

B. The Datagram Routing Problem

The problem of datagram routing is important given the proliferation and growth of connectionless data networks (e.g., the Internet). A datagram network is made of a set of hosts and a set of store-and-forward routers interconnected by a set of links. The main characteristics of a datagram network is that the functions that require knowledge about a "session" (e.g., session duration) or service requirements (e.g., reliable delivery of packets) are relegated to an end-to-end transport protocol, established between the communicating hosts. Two advantages of this are that routing decisions can be made on a node-by-node basis, asynchronously from what goes on in a session, and that the routing algorithm can be distributed. What is required on each router is a function (routing table) that associates an incoming packet with an outgoing port, and a routing algorithm that fills in the routing table entries such that the ensemble of routers operates in a coordinated way. In principle, it is possible to achieve the optimum solution for the general routing problem in a router network. All that is required is a function (routing table) that is able to randomize an input flow among the outgoing ports on a packet-by-packet basis. However, in practice the routing table is a deterministic mapping between the incoming packet destination address and the outgoing port number. Furthermore, although the routing table can be changed as a function of time, its entries have a long lifetime. These practical limitations have two major implications on routing. First, the deterministic mapping translates into single-path routing. Consequently, flow from an origin-destination pair cannot be randomized among several paths, which constitutes single-path routing. Second, only the destination address is used for determining routing. Consequently, once two flows merge towards a common destination, they cannot be subsequently separated. This is called destination-based routing. Thus, datagram routing corresponds to the general routing problem with the additional constraints of single-path routing and destination-based routing.

C. The Shortest-Path Routing Problem

The notion of shortest-path routing as a distributed routing algorithm is one of the outcomes of the ARPANET project. Shortest-path routing is just like datagram routing but with the additional constraint that all routes (i.e., routing table entries) are calculated based on a "distance" metric. In static or quasi-static shortest-path networks (dynamic routing schemes are not considered), a "distance" or link metric is assigned to each link in the network by the network manager. These link metrics are assigned so as to yield good overall network performance as determined by a performance measure. In some instances, this metric assignment is distributed, i.e. each node assigns a metric to its outgoing link. The "distance" metrics are then disseminated among all routers in the network and each router calculates the shortest paths to every other router in the network. The resulting shortest paths determine the routing table entries. The shortest-path constraint is more subtle than the others and it has the effect of "coupling" entries in the routing table.

There are two basic type of protocols that disseminate the routing information through a network of routers: link state and distance vector protocols. In link state protocols, the routers exchange among themselves information about the topology of the network, including information about which links are currently up or down and the "distance" metric associated to each link. See, John Moy, "The OSPF Specification, Version 2," *IETF Draft,* January 1991; and ISO 10589 for detailed information on distributed link-state protocols. After receiving complete information on network topology and on link "distance" metrics, each router then calculates the shortest paths to every other router in the network. Thus, the routing tables of all routers in the network have entries that are consistent and they all synthesize the shortest path routes. In distance vector protocols, the routers exchange with their neighbors information about the distance to every other node in the network. The routing in all routers in the network eventually converges to the shortest path routing. That is accomplished by each router applying the triangle inequality between its distances to each destination and its distance to each neighbor plus each neighbor's distance to each destination, and always selecting the shortest path.

The main advantages of shortest-path routing with respect to datagram routing are that it is easier to manage and more effective upon failures. It is easier to manage since the network manager only has to manage L (i.e., the number of links in the network) values as opposed to N(N−1) values (i.e., the number of routers times the number of entries on each router). It is more robust to configuration errors since if the network manager makes a mistake while assigning a "distance" metric, routing in the network may not be as optimal as it could be; on the other hand, if the network manager makes a mistake while assigning routing table entries, it could have very disruptive effects in the network operation (e.g., looping). It is more robust upon network failures since it does not depend on centralized intervention to change routing tables; upon a network component failure (e.g., a link or a node failure), the appropriate "distance" metrics are set to infinity and new shortest paths are automatically calculated to avoid the failed components.

The existing methods for assigning link metrics have two main features. First, the assignment is distributed, i.e. each node in the network assigns the link metric to its outgoing link or data path. Second, each node looks at the current load in the line to assign a link metric. See J. M. McQuillan, G. Falk and I. Richer, "A Review of the Development and Performance of the ARPANET Routing Algorithm," *IEEE Trans. Comm.,* pp. 1802–1811, Dec. 1978; J. M. McQuillan, I. Rider, and E. C. Rosen, "The New Routing Algorithm for the ARPANET," *IEEE Trans. Comm.,* Vol. COM-28, No. 5, 711–719, May 1980; A. Khanna and J. Zinky, "The Revised ARPANET Routing Metric," *Computer Comm. Review,* SIGCOMM, Oct. 1989. However, these two features of present methods can cause oscillations in the network leading to excessive overhead in inter-nodal information exchange as well as suboptimality in network performance. Thus there is a need for a method of link metric assignment that eliminates network oscillations while providing satisfactory network performance.

SUMMARY OF THE INVENTION

The present invention in typical embodiment relates to a method and apparatus for assigning "distance" or link metrics in a shortest-path routing network that avoid many of the disadvantages of prior methods. The method and apparatus advantageously assign link metrics in a centralized way. The method and apparatus assign the metrics so as to improve network performance, e.g. reduce the average network delay.

BRIEF DESCRIPTION OF THE DRAWINGS

Other features and advantages of the invention will become apparent from the following detailed description taken together with the drawings in which.

DETAILED DESCRIPTION

I. Overview

Figure 1:
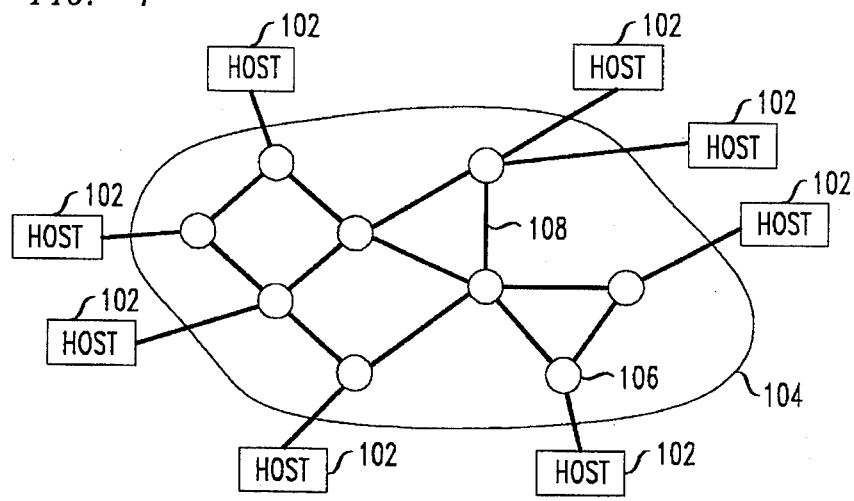
FIG. 1 illustrates a computer network.
Figure 2:
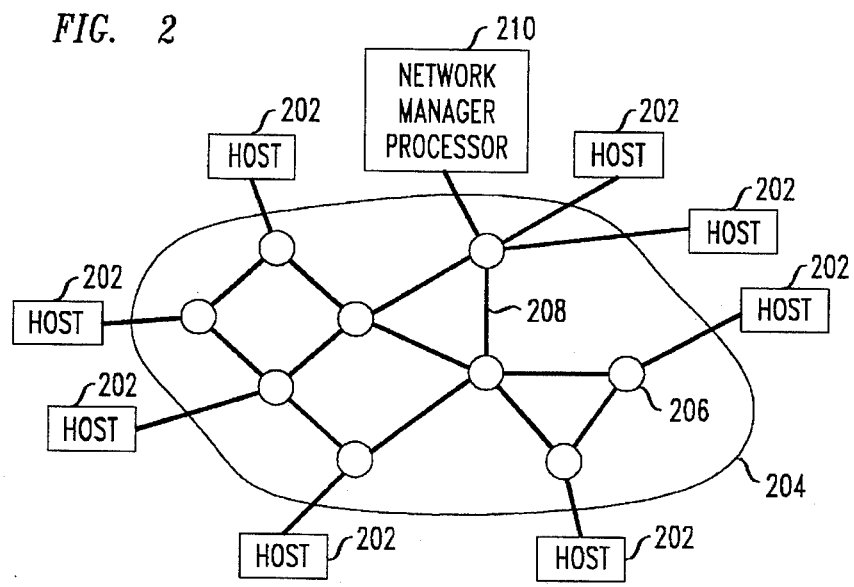
FIG. 2 illustrates embodiment of the invention in a data network.

FIG. 2 presents an illustrative embodiment of the invention in which Network Manager Processor 210 advantageously assigns distance or link metrics to the links in a shortest path routing data network. The data network, comprising Machines 202, a Communications Subnet 204, Routers 206 and Links 208, is similar to that shown in FIG. 1. Network Manager Processor 210 employs a quasi-static link metric assignment strategy in which Network Manager Processor 210 centrally determines the link metric assignments and sends signals to Routers 206 containing information about the assignments. In particular, Network Manager Processor 210 queries from Routers 206 information about origin-destination traffic (i.e. traffic between pairs of nodes in the network). Network Manager Processor 210 then redetermines the link metrics for the network based on the information and sends signals comprising information about the redetermined link metrics to Routers 206. Section II presents an overview of the general routing problem which forms a basis for characterizing and measuring the performance of a shortest path routing method. Section III presents a detailed description of the proposed method and apparatus for link metric assignment. Section IV illustrates the use of the method in an example.

II. The General Routing Problem

A. The N(N−1) Commodity Formulation

The general routing problem can be described in terms of a non-linear multicommodity flow problem. Let G=(N,L) denote a connected directed graph with node set N={$n_1, n_2, \ldots, n_N$} and link set L={$l_1, l_2, \ldots, l_L$} (N and L denote the cardinalities of the node set and the link set respectively), where there is an incidence mapping m:L→N×N which maps a link $l_i$ into an ordered pair of nodes m($l_i$)=($n_{i1}, n_{i2}$). A link will be interchangeably referred to by its link number l or by the ordered node pair (or origin-destination pair) it connects ($n_1, n_2$). Let $C_l$ denote the capacity of link l∈L. A characteristic of typical graphs in data networks is that a given directed link between nodes $n_{i1}$ and $n_{i2}$, there also exists a directed link in the opposite direction (i.e., between nodes $n_{i2}$ and $n_{i1}$). Let K={$k_1, k_2, \ldots, k_K$} denote the set of commodities to be carried by this network, which usually is equal to all origin-destination pairs N(N−1). For each commodity k∈K, a pair of nodes {$v_o^k, v_d^k$} is designated as the origin-destination (OD) pair with the required flow $\lambda^k$ of that commodity. Let $f_{i,j}^k$ denote the flow for commodity k∈K through link (i,j)∈L. Assume $P^k$ is the set of all simple paths connecting OD pair {$v_o^k, v_d^k$}. Then, the mathematical programming formulation for the general routing problem in terms of a Multicommodity Flow Problem (MFP) can be written as:

$$\text{Minimize } Z(f^1, f^2, \ldots, f^K) \quad (1)$$

subject to $$f_{i,j}^k = \begin{cases} \phi_i^k(j)\left(\sum_{h \in H(i)} f_{h,i} + \lambda^k\right); & \text{if } i = v_o^k \\ \phi_i^k(j)\left(\sum_{h \in H(i)} f_{h,i} - \lambda^k\right); & \text{if } i = v_d^k \\ \phi_i^k(j)\left(\sum_{h \in H(i)} f_{h,i}\right); & \text{otherwise,} \\ & \forall k \in K, \forall j \in J(i), \forall i \in N, \end{cases} \quad (2)$$

$$\sum_{j \in J(i)} \phi_i^k(j) = 1, \forall i \in N, \quad (3)$$

$$\phi_i^k(y) \geq 0 \; \forall (i,j) \in L, k \in K \quad (3a)$$

$$f_{i,j}^k \geq 0, \; \forall (i,j) \in L, \forall k \in K, \quad (4)$$

$$\sum_{k \in K} f_{i,j}^k \leq C_{i,j}, \forall (i,j) \in L, \quad (5)$$

where Z is a non-linear objective function of flow vectors $f^k = \{f_{i,j}^k (i,j) \in L\}$ for commodities $k \in K$, $H(i) = \{n \in N(n,i) \in L\}$ (set of nodes in which node i is a neighbor), $J(i) = \{n \in N(i,n) \in L\}$ (set of nodes that are neighbor of node i) and $\phi_i^k(j)$ is the routing variable at node i determining the fraction of the flow from commodity k that is routed to neighbor j.

Network performance may be measured in a variety of ways. A typical performance measure may be based on objective functions whose values depend on the flows only through the total flow at each link $f_l$. Usually, the objective function or performance measure is a convex function of the flows $f_l$, such as average network delay, $$Z(f^1, f^2, \ldots, f^K) = \sum_{l=1}^{L} \frac{f_l}{C_l - f_l} \;. \quad (6)$$

where $$f_l = (i,j) = \sum_{k=1}^{K} f_{i,j}^k \; \forall l \in L \quad (6a)$$

Note that if we sum both sides of (2) with respect to $j \in J(i)$ and substitute constraint (3) in the equation, we would get the usual flow conservation equations. H. Soroush and P. B. Mirchandani, "The Stochastic Multicommodity Flow Problem," *Networks*, Vol. 20, No. 2, pp. 121–155, March 1990. For a given node $i \in N$ and commodity $k \in K$, the difference between supply and demand should be zero unless node i is either an origin $(+\lambda^k)$ or destination $(-\lambda^k)$ of commodity k. The role of constraint (3) is to specify precisely how flows should be divided among the neighbors of node i. Although this extra constraint has no effect on the solution of the MFP, it is an important constraint when considering the problem with additional constraints (e.g., of single path routing and destination based routing). Furthermore, solving for $\phi_i^k(j)$ for all $i,j \in N$ determines the flows $f^k$ for all $k \in K$ and vice versa.

B. The N Commodity Formulation

A more efficient formulation can be obtained by making use of an extra constraint. In our new formulation, each commodity corresponds to the flow towards destination node k. We refer to this additional constraint by destination based routing constraint. This new constraint can be described as follows: when two or more flows from any origin node that are destined towards a common destination node k merge at an intermediate node i, these flows cannot be given differential treatment. We can incorporate the new constraint into the above formulation by simply requiring that, if $v_d^{k1} = v_d^{k2}$, then $\phi_i^{k1}(j) = \phi_i^{k2}(j)$, $\forall i \in N$. However, a more compact formulation can be obtained as follows. First, associate the commodity index k with the node index k; i.e. there are N commodities in the network. Next, let $\lambda_\mu^k$ be the required flow from node $\mu$ to node k. Let $f_l^k$ denote the flow for commodity $k \in K$ through link $l \in L$. Then, the mathematical programming formulation for the general routing problem in terms of a N-Commodity Multicommodity Flow Problem (MFP) N-Commodity can be written as:

$$\text{Minimize } Z(f_1, f_2, \ldots, f_L) \quad (7)$$

subject to $$\sum_{h \in H(i)} f_{h,i}^k - \sum_{j \in J(i)} f_{i,j}^k = \begin{cases} -\lambda_i^k; & \text{if } i \neq k \; \forall \; i \in N \\ \sum_{n=1}^{N} \lambda_n^k; & \text{if } i = k \; \forall \; k \in N \end{cases} \quad (8)$$

$$f_l = \sum_{k \in K} f_l^k \leq C_l, \forall l \in L, \quad (9)$$

$$f_l^k \geq 0, \forall l \in L, \forall k \in N, \quad (10)$$

where Z is a non-linear function of the flows $f_l$, $H(i) = \{n \in N(n,i) \in L\}$, $J(i) = \{n \in N(i,n) \in L\}$.

Equation (8) is the usual flow conservation constraint at a given node $i \in N$ for commodity k. The difference between demand and supply for a given commodity at node i should be equal to (–) the flow originating from node i to node k (i.e., $\lambda_i^k$), or, if i=k (i.e., node i is the destination node k), the total flow for commodity k (i.e., $$\sum_{n=1}^{N} \lambda_n^k).$$

Equation (9) is the usual capacity constraint at a given link l. The sum of all flows a given link l has to be smaller than capacity $C_l$.

The problem formulated as above is a linearly constrained convex programming problem. Since the objective function is convex and the feasible solution space is compact, there exists a unique global minimum of problem (7)–(10).

Note that with such a choice of state variable (i.e., $f_l^k$ as opposed to $f_l^{i,k}$, where i denotes the origin node), the additional constraint of destination-based routing is implicit in the formulation. For the case where flows are continuous variables, i.e., the general routing problem, this additional constraint does not affect the optimal solution and provides a simpler formulation with less state variables.

III. The Shortest-Path Routing Problem

A. Overview

As discussed above, the shortest path (SP) routing problem has destination based routing. However, unlike the N-Commodity general routing problem, randomizing the routing is not permitted. All data from a source to a destination should follow the same path. In addition, the path should be the shortest path between the origin and destination nodes as measured by the link metrics.

Formulating the shortest-path routing problem in terms of additional constraints to the general N-Commodity routing problem is difficult. A necessary condition for a solution to conform with the shortest-path constraint is that, if two nodes (i.e., $n_1$ and $n_2$) belong to two (or more) different paths (i.e., path $a \equiv i, \ldots, n_1, \ldots, n_2, \ldots, j$ and path $b \equiv k, \ldots, n_1, \ldots, n_2, \ldots, m$) then the two paths (i.e., a and b) have to be identical between those two nodes. However, enforcing this new constraint in a Multicommodity Flow formulation would be difficult since the MFP would have to be reformulated in terms of path variables resulting in a bilinear convex integer program whose exact solution may be time consuming to obtain for large networks. Therefore, a combinatorial approach is used to achieve an approximate solution.

The shortest path routing problem can be stated as follows: define the link metrics for all links $l \in L$ with respect to a given set of demands such that the resulting set of shortest paths achieves the best overall network performance. Thus the crucial element of the problem is the assignment of link metrics.

Consider the graph $G(N,L)$ as defined earlier. Let each link $l \in L$ have associated with it a real number $d_l$ referred to as the distance coefficient of l, and let $D \in R^L$ denote the vector $(d_1, d_2, \ldots, d_L)$. Let S denote the set of all flow f achievable by the solution of a SP routing method over the values of $D \in R^L$. Here the set of feasible solutions is restricted to those solutions to the MFP described in the general routing problem section, subject to single-path routing, destination-based routing and to being a subset of S.

The effect of the shortest-path routing constraint is that of introducing coupling between paths. One way this coupling manifests itself is as follows: if two paths intersect at two points, they must be identical between those two points. The above characteristic can be viewed as a necessary condition for a set of routes to be realized through shortest path algorithms (i.e., longest path algorithms also have this characteristic).

B. A Method and Apparatus for Assigning Link Metrics

Figure 3:
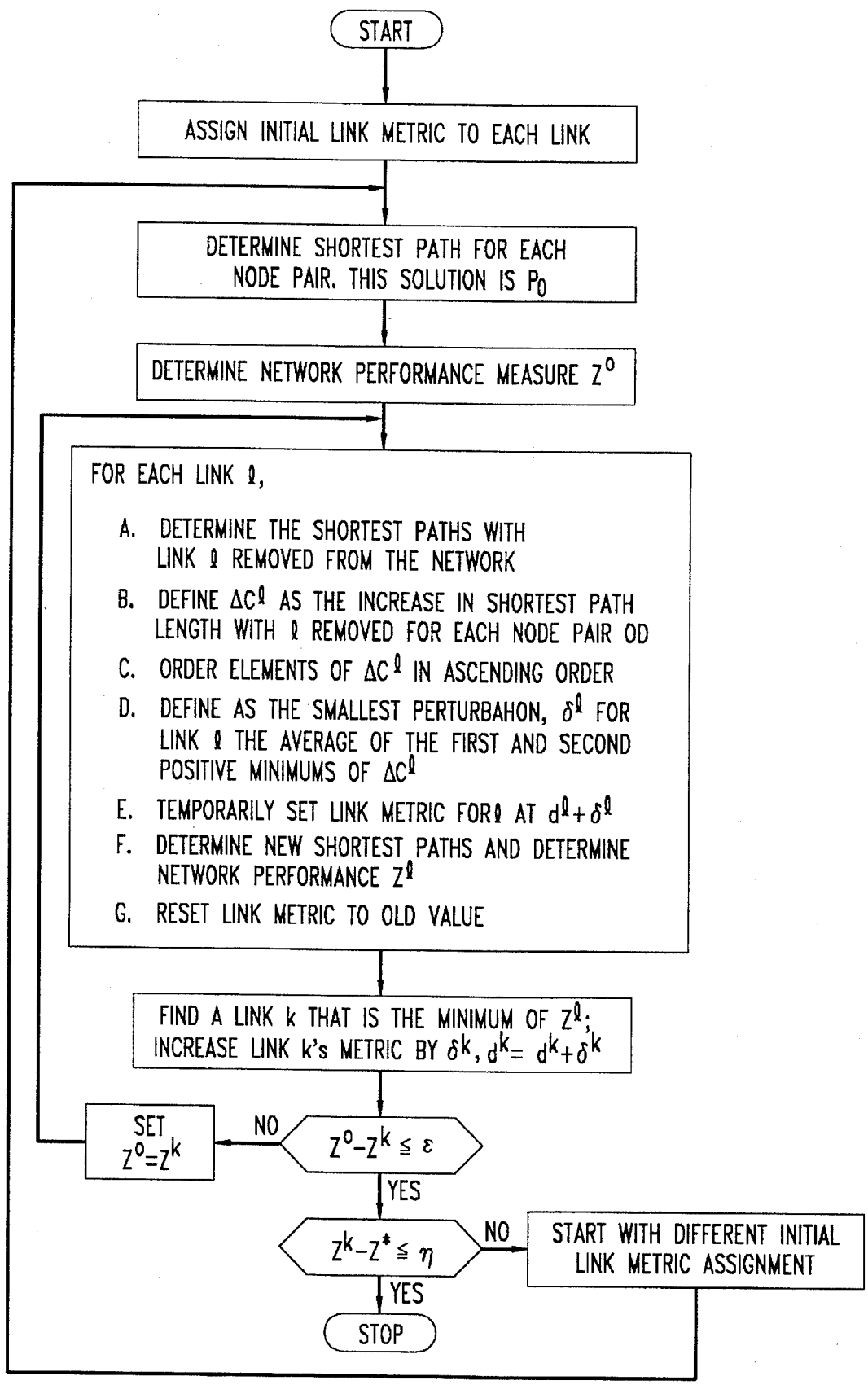
FIG. 3 illustrates the steps in the method for assigning distance metrics to links in a network.

FIG. 3 illustrates the steps in the method for assigning link metrics. Network Manager Processor 110 in FIG. 2 may advantageously use this method to send signals comprising link metric assignment information to Routers 206. The basic idea of the proposed method is to perform a local search in a well defined neighborhood. The neighborhood considered here is that of a minimal route change. The objective function or performance measure is that of equation (6).

Consider a point $P_0$ which denotes a set of shortest paths obtained from a given initial distance link metric vector $D_0 \in R^L$. Initially, distance link metric values that are the inverse of the link capacity may be selected. Define a neighborhood or set of neighbors of $P_0$ called divert by:

$V(P_0) = \{P\}$ where $\{P\}$ is a set of points, where each point is a set of shortest paths, such that only a minimum number of paths are changed with respect to $P_0$ as a consequence of an increase in a single component of $D_0$.

To find solutions locally optimal to an instance of our problem, define the function improve($P_0$) as the one that returns the point or neighbor in the neighborhood of $P_0$ that most improves the objective function or performance measure $Z(f)$.

$$\text{improve}(P_0) = \begin{cases} P_1 \in V(P_0) \ Z(f(P_1)) < Z(f(P_0)); \ \forall \ P' \in V(P_0) \\ \text{no; if such } P_1 \text{ does not exist,} \end{cases} \quad (11)$$

where $f(P_i)$ corresponds to the flow vector resulting from calculation of shortest paths $P_i$ for the link distance assignment vector $D_i$, $Z(f(P_i))$ is the objective function evaluated at $f(P_i)$.

The algorithm we adopt for finding the locally optimal solution is:

```
begin                                    (12)
    P = P_0
    while improve(P)) ≠ no do
        find(V(P))
        P = improve(P)
    end do
    return P
end
```

Note that what is defined here is a local search algorithm over a well defined neighborhood. Thus, the only remaining steps are to actually find the neighborhood and the link distance metric that realizes each point in the neighborhood.

Consider a particular link 1 and let $p_l$ denote the set of origin-destination (OD) pairs that have paths through l. Here a suitable increase in the distance of link l is sought such that only the minimum number of paths are diverted from link l. This is achieved by first diverting all paths that go through that link (setting its distance to infinity). Then sort the OD pairs in increasing order with respect to the difference between their path distances after and before all paths were diverted from link l. The paths that suffered the least increase in distance correspond to the ones to divert and the suitable increase, $\delta^l$, in the distance of link l is any value larger than the least increase and the next-to-least increase in distance experienced by those paths. In the method, the midpoint between those two values may typically be selected.

Consider the set of OD pairs $k \in p_l$. Let $\Delta C_k^l$ denote the difference of cost between the shortest path for OD pair k and the new shortest path after link l is removed from the network. Thus, $\Delta C_k^l$ corresponds to the threshold value in which, if the cost of any link that belongs to the shortest path of OD pair k is increased by an excess of that amount, the shortest path is guaranteed to cease being the shortest path. Consequently, for each link l, there will be a OD pair (or a set of OD pairs) $k_1^l$ such that $\Delta C_{k_1}^l \leq \Delta C_k$ $k \in p_l$. Similarly, there will be another OD pair (or set of OD pairs) $k_2^l$ such that $\Delta C_{k_2}^l \leq \Delta C_k$ $k \in p_l$, $k \neq k_1^l$. Thus, an increase in link cost at link $l(\Delta C^l)$ that exceeds $\Delta C_{k_1}^l$ but not $\Delta C_{k_2}^l$ would cause the minimum number of shortest paths diverted (i.e., a point in the neighborhood V). That is, the path for OD pair (or set of OD pairs) $k_1^l$ will have their paths diverted.

It can be shown that the method converges in bounded time. Since there is a bounded number of points P, the number of spanning trees in the network can be shown to be an upper bound to the cardinality of the set of possible P. The method never visits a point P twice since the search is strictly descending in Z(f). Therefore, the method cannot possibly have more iterations than the size of the state space, and thus the method converges in bounded time. The complexity of a step is $O(|K||L|\log|N|)$ and is dominated by the complexity of finding the neighborhood V.

Since the SP routing problem is NP-hard, it is unclear whether the method with its combinatorial approach converges to the global optimal solution. While it can be proved that the method converges to a local minimum, only estimates can be made of how good the local minimum is. To make this estimate, the following strategy is used: solve the N-Commodity general routing problem and obtain the optimal value of the network performance, $Z^*$. It can be shown that $Z^*$ is a lower bound on the optimal network performance of the SP routing problem. Thus, compare $Z^*$ with the local minimum solution performance Z. If the difference $Z-Z^*$ is small, (i.e. less than $\eta$) then the performance is satisfactory. If the difference is large, the search can be repeated with a new initial point.

IV. An Example

Figure 4:
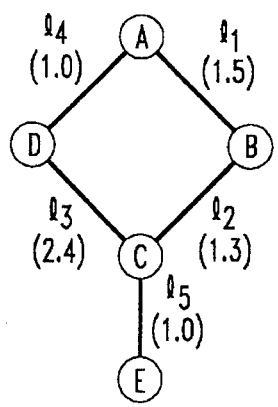
FIG. 4 illustrates an example data network.

The procedure for finding the neighborhood V is illustrated with an example. FIG. 4 depicts a network with five nodes (A,B,C,D, and E) and five links $(l_1,l_2,l_3,l_4,l_5)$ with respective link cost of $D_0=(1.5,1.3,2.4,1.0,1.0)$. Table 1 depicts all OD pairs, their shortest path costs and their shortest path cost when each one of the links is removed. Table 2 depicts all links, the OD pair $k_1^l$, the $\Delta C_{k_1}^l$ and the $\Delta C_{k_2}^l$. Thus, there are four neighbors of $P_0$ each resulting from perturbations of $D_0$, namely $(1.5+\Delta C^1,1.3,2.4,1.0,1.0)$, where $0.6<\Delta C^1<1.2$, $(1.5,1.3+\Delta C^2,2.4,1.0,1.0)$, where $0.6<\Delta C^2<3.6$, $(1.5,1.3,2.4+\Delta C^3,1.0,1.0)$, where $1.4<\Delta C^3<2.8$, $(1.5,1.3,2.4,1.0+\Delta C^4,1.0)$, where $1.2<\Delta C^4<4.2$. Although link cost is a continuous variable, all the link cost vectors that map into the same set of shortest paths correspond to the same discrete point in the neighborhood V. Note that there is no neighbor resulting from an increase of $l_5$ cost since no path can be diverted from there (i.e., leading to a reduction in state space).

To decide which of the four neighbors to choose, evaluate the objective function at the four points and choose the one with the largest decrease in the objective function. This results in a new set of distance metrics. Then repeat the above procedure until the objective function ceases to improve (i.e. improves less than an amount $\epsilon$) at which time the local minimum has been found.

This disclosure deals with a method and apparatus for link metric assignment in shortest path networks. The method and apparatus have been described without reference to specific hardware or software. Instead, the method and apparatus have been described in such a manner that those skilled in the art can readily adapt such hardware and software as may be available or preferable for particular applications.

TABLE 1

| O-D Pair | Primary Path Cost | $l_1$ | $l_2$ | $l_3$ | $l_4$ | $l_5$ |
| --- | --- | --- | --- | --- | --- | --- |
| A-B | 1.5 | 4.7 | — | — | — | — |
| A-C | 2.8 | 3.4 | 3.4 | — | — | — |
| A-D | 1.0 | — | — | — | 5.2 | — |
| A-E | 3.8 | 4.4 | 4.4 | — | — | ∞ |
| B-C | 1.3 | — | 4.9 | — | — | — |
| B-D | 2.5 | 3.7 | — | — | 3.7 | — |
| B-E | 2.3 | — | 5.9 | — | — | ∞ |
| C-D | 2.4 | — | — | 3.8 | — | — |
| C-E | 1.0 | — | — | — | — | ∞ |
| D-E | 3.4 | — | — | 4.8 | — | ∞ |

TABLE 2

| Link | $k_1^l$ | $\Delta C_{k^l_1}$ | $\Delta C_{k^l_2}$ |
| --- | --- | --- | --- |
| $l_1$ | A-C, A-E | 0.6 | 1.2 |
| $l_2$ | A-C, A-E | 0.6 | 3.6 |
| $l_3$ | D-E | 1.4 | 2.8 |
| $l_4$ | B-D | 1.2 | 4.2 |
| $l_5$ | — | — | — |

We claim:

1. A method of routing information in a network, the method comprising the steps of:
   assigning link metrics in said network, wherein said network comprises nodes connected by links, the step of assigning comprising the steps of:
   a. assigning an initial link metric value to each link;
   b. determining an initial set of shortest paths between each pair of nodes in said network;
   c. determining a level of initial performance of said network with said initial link metric values according to a performance measure;
   d. finding a neighborhood to said initial set of shortest paths wherein said neighborhood is a set of neighbors and wherein each neighbor is a set of shortest paths and associated link metrics wherein only a minimum number of paths in the set of shortest paths for each neighbor are changed with respect to the initial set of shortest paths as a consequence of an increase in an initial link metric associated with a specific neighbor;
   e. selecting the neighbor in said neighborhood that yields a performance level for said network meeting a first performance criterion as determined according to the performance measure; and
   f. assigning as link metrics for said network the link metrics associated with said selected neighbor; and
   routing information on a single path between a pair of nodes, said single path between said pair of nodes being determined as a function of the assigned link metrics.

2. The method of claim 1 wherein said step of finding a neighborhood further comprises the steps of:
   a. for each link l:
      determining the shortest paths between each pair of nodes with link l removed;
      determining a set of increases in the length in said shortest paths over said initial set of shortest paths;
      ordering elements of said set of increases in ascending order;
      defining as a perturbation for link l the average of the first and second positive minimum elements of said set of increases;
      increasing the link metric for link l by said perturbation and determining a new set of shortest paths;
      determining the performance of said network according to said performance measure for said new set of shortest paths;
      resetting the link metric for link l; and
   b. finding the link that provides a performance level for said network which meets a predetermined second performance criterion and increasing the metric of said link by the perturbation for said link.

3. The method of claim 1 wherein the step of assigning comprises the step of sending a signal from a network manager processor to said nodes in said network wherein said signal comprises information regarding a subset of said link metrics.

4. The method of claim 1 wherein each link in the network is characterized by a link capacity and wherein said initial link metric for each link in said network is initially selected as the inverse of the link capacity for said each link.

5. The method of claim 1 wherein said performance measure is average network delay.

6. The method of claim 1 wherein said initial link metric is based on a measure of traffic between sets of nodes in said network measured over an interval.

7. A system for routing information in a network by assigning link metrics in said network, wherein said network comprises nodes connected by links, said system comprising:
   a. means for assigning an initial link metric value to each link;
   b. means for determining an initial set of shortest paths between each pair of nodes in said network;
   c. means for determining a level of initial performance of said network with said initial link metric values according to a performance measure;

d. means for finding a neighborhood to said initial set of shortest paths wherein said neighborhood is a set of neighbors and wherein each neighbor is a set of shortest paths and associated link metrics such that only a minimum number of paths are changed with respect to the initial set of shortest paths as a consequence of an increase in each initial link metric;

e. means for selecting the neighbor in said neighborhood that yields a performance level for said network meeting a predetermined criterion as determined according to a performance measure;

f. means for assigning as link metrics for said network the link metrics associated with said selected neighbor; and g. means for routing information on a single path between a pair of nodes, said shortest path being determined as a function of the assigned link metrics.

8. The method of claim 1 wherein said single path is the shortest path between said pair of nodes as determined as a function of the assigned link metrics.

9. The system of claim 7 wherein said single path is the shortest path between said pair of nodes as determined as a function of the assigned link metrics.

* * * * *